US009738830B2

(12) United States Patent
Tao et al.

(10) Patent No.: US 9,738,830 B2
(45) Date of Patent: Aug. 22, 2017

(54) NON-CALCIUM GEOPOLYMER STABILIZER

(71) Applicants: Mingjiang Tao, Worcester, MA (US); Mo Zhang, Worcester, MA (US)

(72) Inventors: Mingjiang Tao, Worcester, MA (US); Mo Zhang, Worcester, MA (US)

(73) Assignee: Worcester Polytechnic Institute, Worcester, MA (US)

( * ) Notice: Subject to any disclaimer, the term of this patent is extended or adjusted under 35 U.S.C. 154(b) by 0 days.

(21) Appl. No.: 14/920,074

(22) Filed: Oct. 22, 2015

(65) Prior Publication Data

US 2016/0272887 A1    Sep. 22, 2016

Related U.S. Application Data

(60) Provisional application No. 62/067,559, filed on Oct. 23, 2014.

(51) Int. Cl.
*E02D 3/12* (2006.01)
*E02D 3/02* (2006.01)
*C09K 17/08* (2006.01)
*C04B 28/00* (2006.01)

(52) U.S. Cl.
CPC ............ *C09K 17/08* (2013.01); *C04B 28/006* (2013.01); *E02D 3/123* (2013.01)

(58) Field of Classification Search
CPC .. E02D 3/00; E02D 3/005; E02D 3/02; E02D 3/12; E02D 3/123
See application file for complete search history.

(56) References Cited

U.S. PATENT DOCUMENTS

| 4,168,593 | A | * | 9/1979 | Jankowiak | ............... E02D 3/00 106/900 |
| 4,859,367 | A | * | 8/1989 | Davidovits | ........... C02F 11/008 106/286.5 |
| 5,228,808 | A | * | 7/1993 | McKennon | ............ C09K 17/06 106/706 |
| 5,245,120 | A | * | 9/1993 | Srinivasachar | .......... A62D 3/33 405/128.8 |

(Continued)

FOREIGN PATENT DOCUMENTS

| CA | 2872167 A1 * | 12/2014 | ............. C09K 17/40 |
| CN | 101712546 A * | 5/2010 | ........... C04B 28/008 |
| WO | WO 9942231 A1 * | 8/1999 | ............... B09C 1/08 |

OTHER PUBLICATIONS

Zhao, et al., Effects of Chemical Stabilitzers on an Expansive Clay. KSCE Journal of Civil Engineering (2014) 18(4):1009-1017.

(Continued)

*Primary Examiner* — Frederick L Lagman
(74) *Attorney, Agent, or Firm* — Chapin IP Law, LLC

(57) ABSTRACT

Geopolymers are one type of aluminosilicate materials formed through the polymerization of silicate and aluminate tetrahedrons. Geopolymer is used as a non-calcium-based stabilizer to mix with sulfate-rich soils. The stabilized soils were exposed to deionized water for 7 days until the volume of soil samples reached constant. Volumetric expansion of the sulfate-rich soil samples stabilized with metakaolin based geopolymer was 7 times lower than those stabilized with lime while the mechanical strength of stabilized soil samples were significantly improved.

18 Claims, 7 Drawing Sheets

(56) References Cited

U.S. PATENT DOCUMENTS

| | | | | |
|---|---|---|---|---|
| 5,263,797 | A | * | 11/1993 | Lindstrom .............. C04B 28/02 106/718 |
| 5,700,107 | A | * | 12/1997 | Newton ................... B09C 1/08 106/705 |
| 2007/0031195 | A1 | * | 2/2007 | Canteri ..................... E02D 3/12 405/240 |
| 2011/0132232 | A1 | * | 6/2011 | Catalan .................. C04B 24/06 106/695 |
| 2013/0019780 | A1 | * | 1/2013 | Karimi ................. C04B 28/006 106/708 |
| 2013/0284070 | A1 | * | 10/2013 | Dubey ................... C04B 11/28 106/695 |
| 2015/0016895 | A1 | * | 1/2015 | Abdullah ................. E02D 3/00 405/263 |
| 2016/0137551 | A1 | * | 5/2016 | Le Gouil ................ C04B 12/04 106/793 |

OTHER PUBLICATIONS

Zhang, M., et al., Experimental feasibility study of geopolymer as the next-generation soil stabilizer. Construction and Building Materials, 2013. 47: p. 1468-1478.

Temuujin, J., et al., Preparation and Characterisation of fly ash based geopolymer motars. Construction and Building Materials (2010) 1906-1910.

Zhang, M., et al., Synthesis factors affecting mechanical properties, microstructure, and chemical composition of red mud-fly ash based geopolymers. Fuel, 2014. 134: p. 315-325.

Ferone, et al., Application-Oriented Chemical Optimization of a Metakaolin Based Geopolymer. Materials 2013, 6, 1920-1939.

International Search Report, PCT/US2016/035996, dated Oct. 20, 2016, pp. 6.

\* cited by examiner

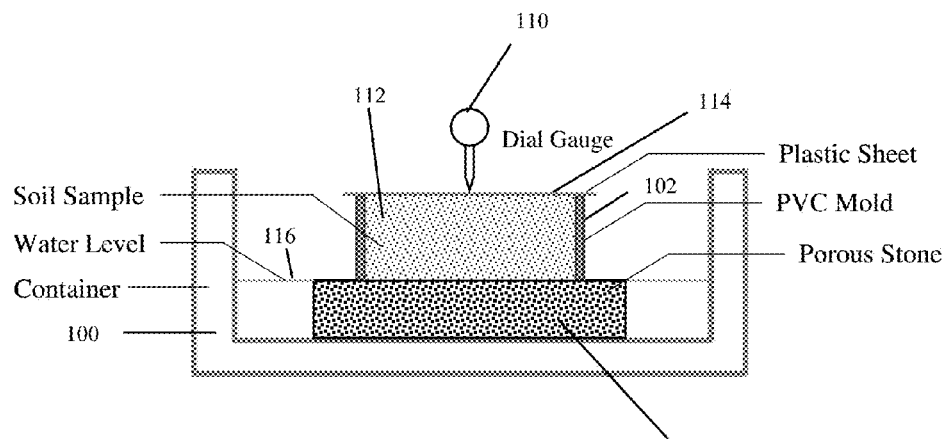
Figure 1.
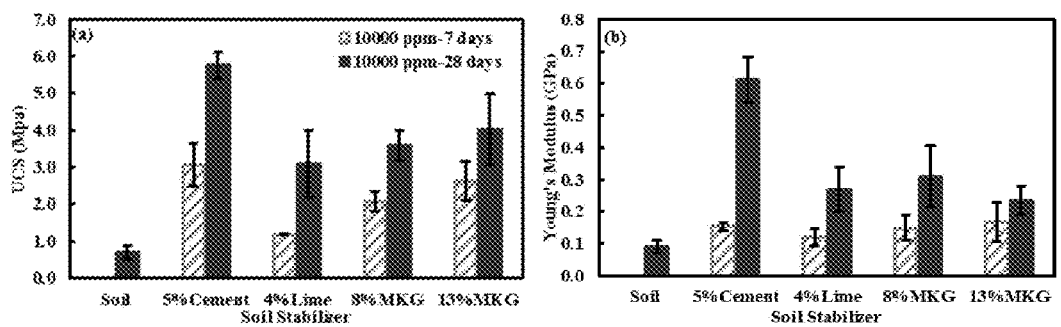
Fig. 2A
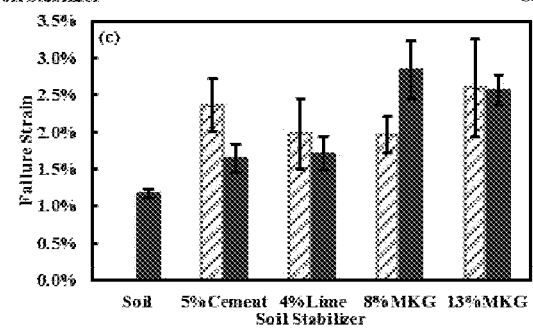
Fig. 2B
Fig. 2C

NON-CALCIUM GEOPOLYMER STABILIZER

RELATED APPLICATIONS

This application claims the benefit under 35 U.S.C. §119 (e) of U.S. Provisional Patent Application No. 62/067,559 filed Oct. 23, 2014, entitled "NON-CALCIUM GEOPOLYMER STABLIZER," incorporated herein by reference in entirety.

STATEMENT REGARDING FEDERALLY SPONSORED RESEARCH AND DEVELOPMENT

This invention was made with government support under contract Nos. NSF-CMMI-1301048 and 1301070 awarded by the National Science Foundation (NSF). The government has certain rights in the invention

BACKGROUND

Modern building construction often relies upon soil bearing capacity for determining foundation design. Foundation design and load-bearing members such as footings and pilings are often based on the relevant soil bearing parameters. Cement and lime are two of the most broadly used calcium-based stabilizers to improve bearing capacity of weak and soft subbase and subground soils. However, heave and cracks have been found in many sulfate-rich soil stabilization projects using cement and lime.

SUMMARY

A metakaolin based geopolymer stabilizes sulfate-rich soils to improve the mechanical properties of soil for load bearing and related capacities. The geopolymer is used as a non-calcium-based stabilizer to mix with sulfate-rich soils such that calcium cations are not introduced to soils and react with sulfate ions to form ettringite crystals. In a particular arrangement, the method of stabilizing ground bearing surfaces includes synthesizing a geopolymer, combining the synthesized geopolymer with sulfate rich soils in the absence of calcium to generate soil having improved mechanical properties, and compacting the generating soil to a maximum capacity compaction. The geopolymer is a metakaolin based geopolymer, and may include aluminosilicate materials formed by the polymerization and polycondensation of aluminate and silicate tetrahedrons by sharing oxygen atoms. In the example arrangement, the geopolymer is is $M_n\{-SiO_2)_x-AlO_2-\}_n$, where M is a cation to balance the negative charge of $(AlO_2)^{-1}$ and The z value is the Si to Al molar ratio. Combining the geopolymer with the soil further includes soil having at least 1000 ppm gypsum concentrations and metakaolin concentration between 8% and 13%, such that the resulting mechanical properties are based on binding soil particles rather than ion exchanging, as in conventional approaches.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

FIG. 1. Shows a Schematic illustration of Swelling Potential Testing Setup with Dial Gauges Where Soil Samples Soaked in Deionized water to Absorb Water through Porous Stones;

FIGS. 2A-2C show (a) UCS, (b) Failure Strain, and (c) Young's Modulus of the Soil Samples with 10,000 ppm Gypsum Cured for 7 Days and 28 Days;

DETAILED DESCRIPTION

Figure 3A:
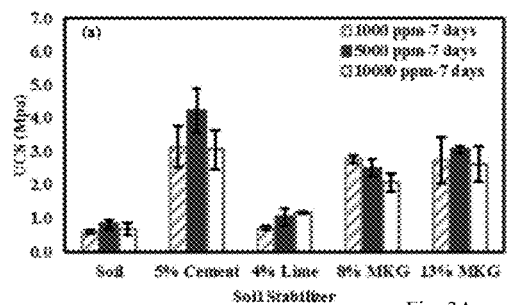
FIGS. 3A-3F show (a) Compressive Strength, (b) Failure Strain, and (c) Young's Moduli of Soil Samples Cured for 7 Days; and (d) Compressive Strength, (e) Failure Strain, and (f) Young's Moduli of Soil Samples Cured for 28 Days to Show the Effect of Gypsum Concentration on the Mechanical Properties of the Soil Samples.

Various configurations depicting the above features and benefits as disclosed herein are shown and described below. The expansion and heaving of sulfate-rich soils is a long-lasting challenge for soil stabilization with calcium based stabilizers, such as lime and cement. It is caused by the formation of an expansive mineral, ettringite, when calcium and water are introduced to a sulfate concentrated soil. This study aims to explore the feasibility of using non-calcium geopolymer, which is an inorganic aluminosilicate cementitious material, as a stabilizer for sulfate-rich soils. To this end, metakaolin based geopolymer (MKG) was used to stabilize a synthetic lean clay premixed with 1,000, 5,000 and 10,000 ppm of gypsum. The clay samples were stabilized with MKG at 8 and 13 wt %, and their mechanical properties and swelling potential were determined through unconfined compression test and water bath soaking, respectively. Scanning electron microscopy (SEM), energy dispersive X-ray spectroscopy (EDX) and X-ray diffractometer (XRD) tests were performed to further examine the microstructural and mineralogical characteristics of the clay samples. In addition, control sample sets, including unstabilized clay, lime- and cement-stabilized clay, were prepared and tested for providing a reference baseline to evaluate if MKG is an effective stabilizer for sulfate-rich soils. The unconfined compressive strength, Young's Moduli and failure strain of the clay soils were significantly increased after the stabilization with MKG. The swelling strain of the samples stabilized with the geopolymer was much lower than that of 4% lime stabilized counterparts after soaking in water. Geopolymer gels, but no ettringite crystal, were detected in geopolymer stabilized clay samples, as confirmed with the SEM-EDX results and XRD spectra. The results from this study confirmed that non-calcium geopolymer can be an effective stabilizer for sulfate-rich soils without excessive expansions. Using higher concentrations of geopolymer and geoplymers synthesized from industrial wastes is worth being studied in the future to further develop geopolymer-based stabilization technique for sulfate-rich soils.

Soil stabilization with lime or cement is a well-established soil treatment technique and has been widely used to improve the load bearing capacity of soft and weak soils in civil engineering construction, such as foundations and pavements. However, the use of calcium-based lime or cement to treat the soils rich in sulfate-bearing minerals often causes more problems than it solves. This is because expansive minerals such as ettringite and/or thaumastie are formed in the presence of adequate moisture when sulfate-rich soils are treated with calcium-based stabilizers. Once it is formed, ettrinigite continues to expand due to crystal growth and/or hydration reactions, leading to a significant amount of heaving that can result in distress and damage to light-weight structures such as pavement and residential buildings. For example, ettringite can expand up to 250% while exposing to water The $Ca^{2+}$ in the stabilizers and $Al^{3+}$ in the soils are consumed to form entringite crystals instead of cementitious materials with the presence $SO_4^{2-}$ and the availability of water in the following procedure:

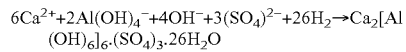

With the presence of sulfate rich soils in southern, western, and southwestern United States, the ettringite induced heaving has resulted in many damages at billions of dollars to numerous building structures. Many case studies have been reported in the literature where sulfate-induced heave has resulted in distresses or structural damage. Mitchell firstly reported the swelling damage in sulfate-bearing soils stabilized with lime in Nevada, while Hunter reported another lime-induced heave in sulfate-bearing clay in Nevada. Perrin summarized three considerable damages in Texas between 1988 and 1989 due to the heave introduced in subgrade soils by the reactions between cement or lime and soluble sulfate bearing soils in poor drainage environments. Two experimental research projects were conducted by TxDOT between 1993 and 1994 to assess sulfate-bearing soils stabilized with cement or lime with different methods, and ridges and heaves were observed in both of the projects. Another pavement failure due to the swelling in cement-stabilized sulfate-rich sandy soils in Georgia was reported by Rolling, et al. Since then, more research studies have been carried out to address sulfate-induced swelling when calcium based stabilizers, such as lime and cement, are used to treat sulfate-bearing subground soils [].

Research studies have been conducted to explore new ways to stabilizing sulfate-rich soils. Lime-fiber, cement kiln dust, granulated blast furnace slag and fly ash have been used to partially substitute lime or cement to stabilize sulfate-rich soils. However, swelling issues have not been effectively addressed for sulfate-bearing soils, because most of the alternative stabilizers are still calcium based materials and the stabilization mechanism remains unchanged. Some of the recent developed non-traditional stabilization techniques, such as sulfate resistant cement stabilization, rubber-soil technology and polymer stabilization, are limited in applicability due to high cost or practical complexity. Therefore, effective stabilization of sulfate-rich soils without excessive expansion during serving period still remains a great technical challenge in geotechnical engineering community.

As an emerging construction material, geopolymer has been explored on its applications in concrete, soil stabilization, fire-proof coating, and toxic waste immobilizations because of its excellent chemical resistance, thermal stability, and durability, besides its mechanical properties comparable to ordinary Portland cement. Geopolymer is an inorganic material synthesized by the polymerization of silicon- and aluminum-tetrahetra. The simplified chemical formula of geopolymer is: $M_n\{-(SiO_2)_z-AlO_2-\}_n$, where M is the cation to balance the negative charge of $(AlO_2)^{-1}$, such as sodium ($Na^+$) or potassium ($K^+$); while z is the Si to Al molar ratio, which is a vital factor determining the mechanical properties of the resulting geopolymers. When z is less than 3, the synthesized geopolymers form three dimensional networks that exhibit stiff and brittle properties and can be used as ceramic or cementitious materials; and while z is greater than 3, the resulting geopolymers have more linearly linked structures which show rubbery and adhesive properties. In the geopolymerization processes, the silicon- and aluminum-tetrahedra are released via the dissolution of raw materials in alkaline solutions, and polymerized into the oligomers at different sizes that are further condensed into geopolymer gels.

Geopolymers can be synthesized from abundant aluminum- and silicon-rich raw materials such as metakaolin, fly ash, furnace slag, and red mud, most of which are industrial wastes. The proper curing temperature for geoplymerization is between room temperature to 80° C., which makes the synthesis process of geopolymer much less energy consuming and more sustainable than ordinary Portland cement. Therefore, geopolymer provides a promising and sustainable alternative to ordinary Portland cement as a construction material.

As a cementitious material, geopolymer has been shown its effectiveness in soil stabilization. In previous studies, metakaolin- and fly ash-based geopolymers were used to stabilize deep and shallow soils by jet grouting and mechanical mixing, respectively. Geopolymer stabilized soils showed comparable mechanical strength and stiffness to cement stabilized soils while less volumetric change was observed in geopolymer-stabilized samples. The improvement of the mechanical strength was attributed to the binding effect of geopolymer gels, based on the results of microstructural and mineralogical characterizations. Because of the absence or low concentration of $Ca^{2+}$ in geopolymeric structure, the risk of ettringite formation in sulfate-rich soils will be greatly reduced if geopolymer is used as the stabilizer. To explore if non-calcium geopolymer can be an effective stabilizer for sulfate-rich soils, metakaolin based geopolymer (MKG) was used to stabilize the synthesized lean clay with different gypsum concentrations in this study. Sulfate-rich soil samples were stabilized with MKG at two concentrations, and then their mechanical properties, including unconfined compressive strength, Young's Modulus and failure strain, were determined with unconfined compression tests. The stabilized soil samples were also soaked in water to evaluate their swelling potential, which is the key factor to measure the effectiveness of sulfate-rich soil stabilization. In addition, the stabilization mechanisms and the ettringite formation in MKG stabilized soils were investigated by the microstructural characterization of stabilized and soaked soil samples with scanning electron microscopy (SEM)-energy dispersive X-ray spectroscopy (EDX) and X-ray diffractometer (XRD). Lime- and cement-stabilized soil samples were also prepared and characterized to provide a baseline for assessing the stabilization effect of MKG.

Synthesis of Sulfate-Rich Soil

Sulfate-rich soils were synthesized with sandy soils collected from a construction site on Worcester Polytechnic Institute campus, ANTI-MIN CR kaolin clay and gypsum pellets at different concentrations. The chemical composition of ANTI-MIN CR kaolin clay is shown in Table 2. The gypsum was used to increase the sulfate concentration of the soil because it is one of primary sources of soluble sulfate present in soils, and the reagent grade calcium sulfate dihydrate ($CaSiO_4 \cdot 2H_2O$) was purchased from Fisher Scientific. The kaolin clay was firstly mixed with the collected soil at a dry mass ratio of 3:5 for enhancing its workability, and the geotechnical properties of the synthesized soil were shown in a previous study. The plasticity index (PI) and liquid limit (LL) of the minus −425 μm fraction are 15% and 29% respectively, determined with Atterberg Limits tests based on ATSM D4318. The soil was classified as CL (lean clay or low plasticity clay), according to Unified Soil Classification System (USCS). This soil is too weak to support upper structures, as described in the previous study, so it was selected in this study. The heaving behavior of sulfate-rich soil is affected by various factors, among which the sulfate concentration is a very important one. According to the previous case studies, the sulfate concentration to introduce heaves, as a percentage of dry soil weight, ranges from 320 ppm to 43,500 ppm. In this study, gypsum was mixed with the soil at the concentrations of 1,000, 5,000, and 10,000 ppm to represent low, medium and high level of sulfate content. The gypsum concentration was calculated as:

$$\frac{\text{mass of gypsum (g)}}{\text{mass of synthetic soil (g)} + \text{mass of gypsum (g)}}.$$

The maximum dry density ($\rho_{max}$) and the optimum water content (OWC) of the sulfate-rich soil at each gypsum concentration were determined with Standard Proctor compaction tests following ASTM D698, as shown in Table 1. Sample designation is composed of "Soil Type" and "Gypsum Concentration", where S, 4L, 5C, 8MKG and 13MKG stand for unstabilized soil, and the soils stabilized with 4% lime, 5% cement, 8% metakaolin based geopolymer and 13% metakaolin based geopolymer, respectively; while 1, 5 and 10 stand for 1,000 ppm, 5,000 ppm and 10,000 ppm, respectively. Note that the percentage of the stabilizers is weight based throughout the paper unless specified otherwise. The $\rho_{max}$ and the OWC of the unstabilized soils with different gypsum concentrations are very close, as shown in Table 1. Therefore, for stabilized soils, only the one with 10,000 ppm of gypsum was tested for $\rho_{max}$ and OWC, which were used for preparing all the other soil samples in the following sections.

TABLE I

| Soil Samples | Maximum Dry Density [$\rho_{max}$] (g/cm³) | Optimum Water Content [OWC] (%) |
|---|---|---|
| S1 | 2.10 | 14.0 |
| S5 | 2.04 | 14.6 |
| S10 | 2.09 | 14.0 |
| 4L10 | 1.93 | 20.1 |
| 5C10 | 1.99 | 17.4 |
| 8MKG10 | 1.96 | 19.0 |
| 13MKG10 | 1.95 | 17.7 |

Geopolymer Synthesis

Metakaolin was used in this study to synthesize geopolymer for this proof-of-concept study because it results in relatively pure geopolymer binders. The chemical composition of the metakaolin is shown in Table 2. Metakaolin base geopolymers (MKG) with different starting chemical compositions (nominal Si/Al and Na/Al molar ratios) were tested in a previous study by the authors to determine a proper formula for soil stabilization by considering both the mechanical properties and workability. The geopolymer with a nominal Si/Al molar ratio of 1.7 and a Na/Al molar ratio of 1.0 showed the optimum results and was used in this study. The alkaline activator was the mixture of 50% sodium hydroxide (NaOH), sodium silicate solution ($Na_2O \sim 10.6\%$; $SiO_2 \sim 26.5\%$, 1.39 g/mL at 25° C.), and deionized water at predetermined amount. Metakaolin was mixed with the alkaline activator for 30 minutes and then poured into the prepared sulfate-rich soils. See the previous study for further details on the preparation and mechanical properties of the synthesized MKG.

Sample Preparation for Unconfined Compression Tests and Swelling Tests

MKG at concentrations of 8% and 13% was chosen to stabilize sulfate-rich soils in the present configuration. As shown in the other studies, 3 to 6 wt % of lime was used to stabilize sulfate-rich soils that can significantly improve the mechanical properties but showed apparent swelling on the stabilized soils; and 5% to 20% cement is normally used for soil stabilization. To provide a baseline for assessing the effectiveness of MKG as a sulfate-rich soil stabilizer, soil samples stabilized with 4% lime and 5% cement were prepared as two control groups, with unstabilized soil as another one. The used lime is calcium oxide (CaO) powder from Fisher Scientific, and the chemical properties of metakaolin and Portland cement are summarized in Table 2. The stabilizers were dry mixed with the synthesized soil, and then water was added to reach the predetermined OWC values shown in Table 1. For unconfined compression tests, cylindrical samples with a height of 72 mm and a diameter of 36 mm were compacted in 3 layers with a Harvard Miniature Compaction Apparatus to reach the predetermined $\rho_{max}$. A height to diameter ratio of 2 was used to reduce the end effect during compression tests. All the samples were wrapped with zip bags immediately after compaction and placed in a plastic chamber equipped with a humidifier to maintain a consistent relative humidity (RH) around 40% to 50%. After two days' curing, the samples were exposed to air for the rest of curing period before compression tests. The samples were cured for 7 and 28 days respectively, and the unstabilized soil samples were cured for 7 days after which these samples' mechanical properties retained constant. The unconfined compressive strength (UCS) and failure strain ($\epsilon_f$) of the cured samples were tested with unconfined compression testing procedure using an Instron Compression Machine at a loading rate of 0.2 in./min. The Young's Moduli were derived from the stress-strain curves as introduced in the authors' previous study. The mass and dimension of the samples were monitored during the curing process to determine their volumetric change.

For swelling tests, samples were prepared using the soils with 10,000 ppm gypsum (S10), because the soil with a higher sulfate content has a higher potential to swell. Unstabilized S10, and S10 stabilized with 8% MKG, 13% MKG and 4% lime samples were prepared at the predetermined OWC. PVC molds 102 with a height of 13 mm and an internal diameter of 40 mm were used to prepare disk samples for swelling tests. The samples 112 were compacted to the predetermined $\rho_{max}$ values, cured following the same procedure as the UCS testing samples for 7 and 28 days, and then placed on porous stones 118 sitting in the plastic containers 100 with deionized water shown in FIG. 1. A dial gauge 110 was placed on the surface of the soaked soil samples 112 to monitor the height change while a lightweight plastic sheet 114 was inserted between the dial gauge 110 and the sample surface to prevent the probe from penetrating into soil and offsetting the expansion of soil samples. During swelling tests, the water level 116 was kept even with the stones' 118 surface to ensure the soil samples to stay contact with water via the porous stones 118.

The sample matrix is summarized in Table 3 and three replicates were prepared for each sample set. The sample identifier nomenclature is: soil type-sulfate concentration-test type-curing time. Specifically, for soil types, R, L, C stand for unstabilized soil, lime stabilized soil, and cement stabilized soil, respectively; and MKG8 and MKG13 stand for soil samples stabilized with 8% MKG and 13% MKG respectively. For sulfate concentration, 1, 5, and 10 stand for 1,000, 5,000, and 10,000 ppm, respectively. For test type, U and S stand for unconfined compression tests and swelling tests, respectively. For curing time, 7 D and 28 D stand for 7 and 28 days, respectively.

TABLE 2

| Chemical Composition (wt %) | SiO$_2$ | Al$_2$O$_3$ | Fe$_2$O$_3$ | TiO$_2$ | CaO | MgO | Na$_2$O | K$_2$O | SO$_3$ |
|---|---|---|---|---|---|---|---|---|---|
| Metakaolin | 52.20 | 43.11 | 1.53 | — | 0.07 | 0.06 | 0.07 | 0.22 | 0.99 |
| Type II (MH) Portland Cement | 19.80 | 4.80 | 3.00 | — | 61.90 | 3.80 | 0.61 | — | 3.00 |
| ANTI-MIN CR Kaolin Clay | 45.60 | 38.40 | 0.85 | 1.62 | 0.05 | 0.02 | 0.21 | 0.15 | — |

TABLE 3

| Sample | Sulfate Concentration | Curing Period | Test |
|---|---|---|---|
| R-1-U, L-1-U-7D, C-1-U-7D, MKG8-1-U-7D, and MKG13-1-U-7D | 1,000 ppm | 7 days | Unconfined Compression Tests |
| R-5-U, L-5-U-7D, C-5-U-7D, MKG8-5-U-7D, and MKG13-5-U-7D | 5,000 ppm | | |
| R-10-U, L-10-U-7D, C-10-U-7D, MKG8-10-U-7D, and MKG13-10-U-7D | 10,000 ppm | | |
| R-1-U, L-1-U-28D, C-1-U-28D, MKG8-1-U-28D, and MKG13-1-U-28D | 1,000 ppm | 28 days | |
| R-5-U, L-5-U-28D, C-5-U-28D, MKG8-5-U-28D, and MKG13-5-U-28D | 5,000 ppm | | |
| R-10-U, L-10-U-28D, C-10-U-28D, MKG8-10-U-28D, and MKG13-10-U-28D | 10,000 ppm | | |
| R-10-S, L-10-S-7D, MKG8-10-7D, MKG13-10-7D | 10,000 ppm | 7 days | Swelling Tests |
| R-10-S, L-10-S-28D, MKG8-10-28D, MKG13-10-28D | 10,000 ppm | 28 days | |

Microstructural and Mineralogical Characterization

Microstructural and mineralogical changes of the sulfate-rich soils after stabilization were characterized with scanning electron microscopy (SEM)-energy dispersive X-ray spectroscopy (EDX) and X-ray diffractometer (XRD) on the crushed UCS samples. The swelling test samples were also imaged and characterized after soaking to detect if expansive crystal ettringite is formed. A 10 mm×10 mm×10 mm cube was cut from the crushed UCS samples and the soaked disk samples, respectively, and then a V-shaped groove was cut in the center. The cube was pulled and bent into two parts, with the debris on the broken surface cleaned by adhesive tapes. All the SEM-EDX samples were dried in a desiccator for three days prior to the testing. The surfaces of the cylindrical and disk samples were avoided to exclude the effect of carbonation during the exposure to air. The samples were sputter coated with golden-palladium alloy and stuck on an aluminum stud with two sided conductive tapes before the testing. The samples were scanned in secondary electron mode with a JEOL JSM-7000F field emission SEM. The EDX spectra of the interested structures in the SEM samples were taken in OXFORD INCA x-act instrument installed in the same SEM device. In addition, small chunks were taken from the crushed UCS samples and swelling samples, and about 10 grams were used to grind into fine powders with an agate mortar and pestle. The powder passed through the 45 µm sieve was used for XRD measurements with a Rigaku Geigerflex X-ray powder diffractometer using a Cu-Kα radiation with a voltage of 37.5 kV and a current of 25 mA at 1 sec/step. The data were collected from 10° to 70° 2θ at 0.02°/step and analyzed with MDI Jade 8.0.

Mechanical Properties of MKG Stabilized Sulfate-Rich Soil Samples

After the curing period of 7 days and 28 days, the unstabilized soils with 1,000 ppm, 5,000 ppm and 10,000 ppm gypsum and the soils stabilized using 5% cement, 4% lime, 8% MKG and 13% MKG were tested for the mechanical properties. Per conciseness, only the unconfined compressive strength (UCS), failure strain ($\epsilon_f$), and Young's Modulus (E) of the soil samples with 10,000 ppm gypsum are plotted in FIGS. 4A-4C, because (i) the performances of MKG stabilized soils with different gypsum concentrations are similar, as detailed in the following section, and (ii) the comparison of mechanical properties between the MKG stabilized soils and the control groups for different gypsum concentrations showed similar trends.

For the soil samples with 10,000 ppm gypsum shown in FIGS. 2A-2C, the mechanical properties of soils were also improved significantly after the stabilization with MKG at the concentration of 8% and 13%. The compressive strength of MKG stabilized soils are higher than 4% lime stabilized soil, but still lower than 5% cement stabilized soil, after both the curing time of 7 days and 28 days, as shown in FIG. 2A. The Young's modulus of MKG stabilized soils cured for 7 days is slightly higher than 4% lime and 5% cement stabilized soils; however, after 28 days' curing, the Young's modulus of MKG stabilized soils is lower than 5% cement group, but higher than 4% lime group, referring to FIG. 2B. After 28 days' curing, both 8% and 13% MKG stabilized soils showed higher failure strain than all the control groups (FIG. 2C).

For the soils with different gypsum concentrations, those stabilized with 13% MKG always exhibit better mechanical properties than those stabilized with 8% MKG. This illustrates a higher degree of stabilization at higher MKG concentration. In addition, the mechanical properties of the MKG stabilized soil samples were all improved statistically along the curing time, which is an expected property for long term of service. Particularly, the ductility of MKG stabilized samples remained constant or even increased after a longer curing time, but the soil samples stabilized with 4% lime or 5% cement and cured for 28 days became more brittle than those cured for 7 days.

Gypsum Concentration and Stabilization Effectiveness

Figure 3D:
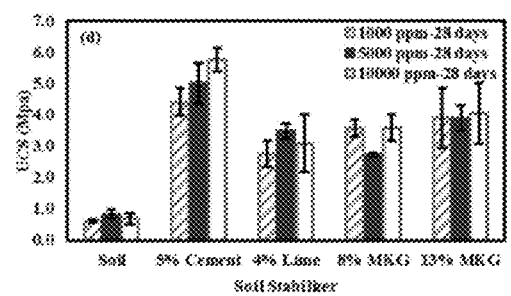

One of the main factors that affects stabilization effectiveness of sulfate-rich soils and the severity of expansion risk of those treated with calcium-based stabilizers is the sulfate content. The consumption of traditional calcium based stabilizers, such as lime and cement, usually needs to be determined based the sulfate concentration. The graphs in FIGS. 3A-3F illustrate the effect of gypsum concentration on the mechanical properties of the soils stabilized by MKG and the control stabilizers. FIGS. 3A and 3D demonstrate that the compressive strength of the stabilized soil samples showed dependences on gypsum concentrations to different extents. For 5% cement, the soils with 5,000 ppm gypsum showed the highest compressive strength after 7 days' curing; but the strength of the soils increases with gypsum concentration after 28 days' curing. For 4% Lime, regardless of curing time, the compressive strength of the soil samples with 5,000 ppm and 10,000 ppm gypsum are statistically higher than the counterparts with 1,000 ppm gypsum. For 8% MKG stabilized soil samples, the strength of the ones with 1,000 ppm and 5,000 ppm gypsum is slightly higher than the counterpart with 10,000 ppm gypsum after 7 days' curing; the soils with 1,000 ppm and 10,000 ppm gypsum showed higher strength than that of the soil with 5,000 ppm gypsum after 28 days' curing. For 13% MKG stabilized soils, the compressive strength is rarely influenced by gypsum concentrations, for both 7-day and 28-day curing samples.

Figure 3B:
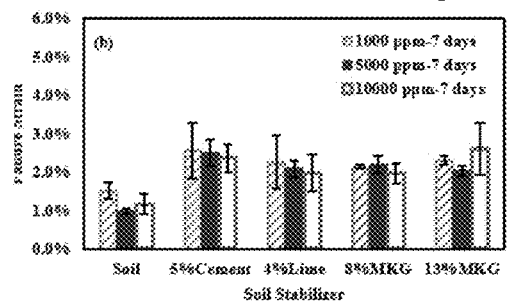
Figure 3E:
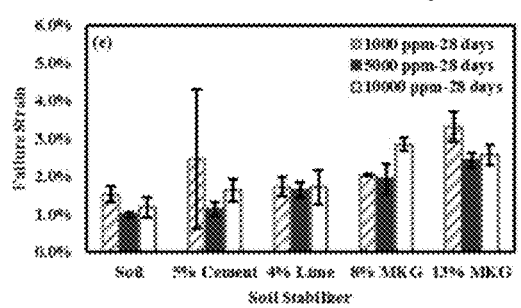
Figure 3C:
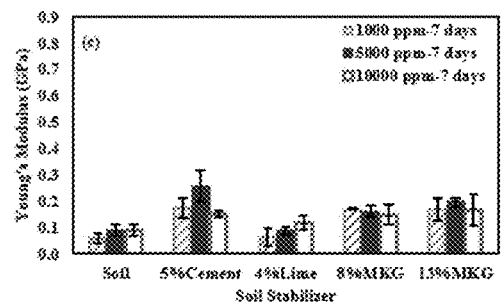
Figure 3F:
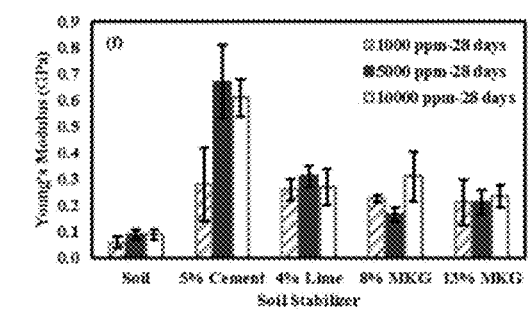

The failure strain of the soils stabilized with cement, lime and MKG showed little dependence on gypsum concentrations, depicted in FIGS. 3B and 3E). The Young's Moduli of 5% cement stabilized soils were significantly affected by gypsum concentrations, but for the soils stabilized with 4% lime, 8% MKG and 13% MKG, the Young's Moduli showed little dependence on gypsum concentrations respectively, referring to FIGS. 3C and 3F.

As illustrated in the current study, the sulfate-rich soils with different gypsum concentrations obtained similar improvement of the mechanical properties after the stabilization with MKG at a relative high concentration (e.g. 13 wt %). This implied that one MKG stabilization scheme can have the similar effectiveness of stabilization on the soils with different sulfate concentrations, and can be applied without the knowledge of sulfate content present in the soil which is usually difficult and costly to determine.

Volumetric Stability of MKG Stabilized Sulfate-Rich Soil Samples During Curing

The volumetric change during curing, in terms of volumetric strain, of the soil samples with different gypsum concentrations after stabilized with 8% MKG, 13% MKG, 4% Lime and 5% Cement is plotted below in FIGS. 4A-4C, and compared to the unstabilized soil samples. The volumetric strain was determined as $$\frac{\text{Volume(curing time)} - \text{Volume(as prepared)}}{\text{Volume(as prepared)}} \times 100\%.$$

Negative percentages represent shrinkage, while positive values stand for expansion. As shown in the figure, all the samples, except the 10,000 ppm soil samples stabilized with 13% MKG, expanded within the first 2 days of curing, and shrank at a relatively large degree from the $2^{nd}$ to $3^{rd}$ day due to the sudden exposure to ambient humidity after taken from sealed bags.

Figure 4A:
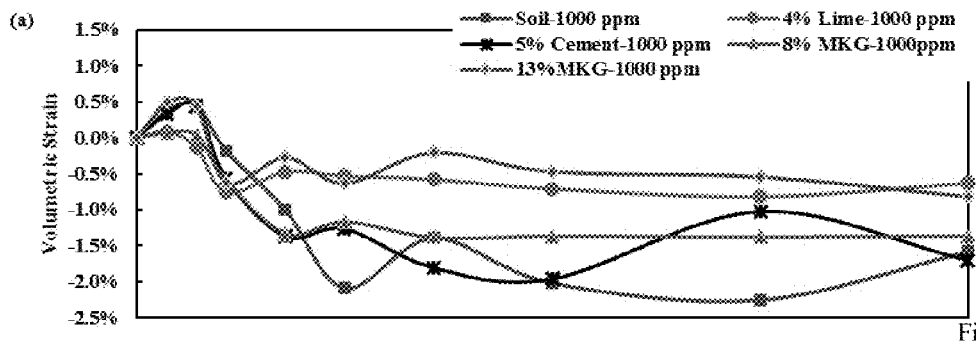
FIGS. 4A-4C show Volumetric Change of the Soil Samples with Gypsum Concentration of (a) 1,000 ppm, (b) 5,000 ppm, and (c) 10,000 ppm along the Curing Time up to 28 Days.
Figure 4B:
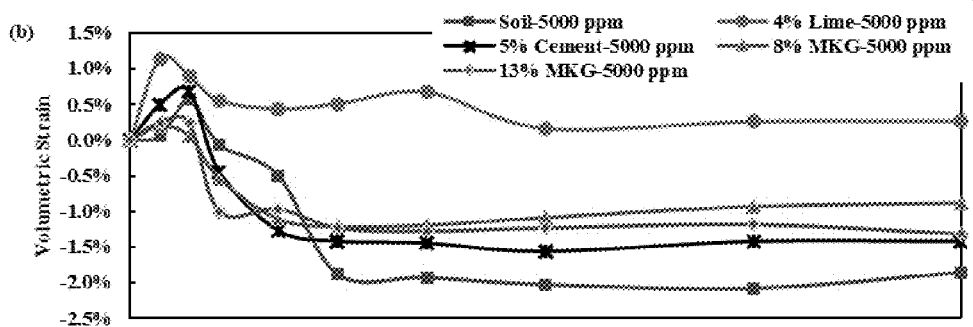
Figure 4C:
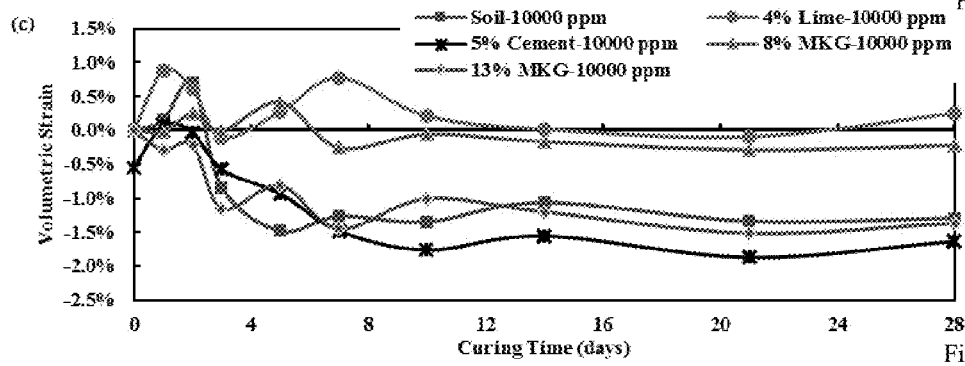

All the soil samples with 1,000 ppm gypsum shrank after the first 2 days' curing as shown in FIG. 4A. The unstabilized soil shrank the most; 8% MKG stabilized soil samples showed much less shrinkage than unstabilized soil samples; the 5% cement stabilized soil shrank less than unstabilized soils but fluctuated during the curing time; and the volume of the samples stabilized with 13% MKG and 4% lime was more stable than the other samples. The soil samples with 5,000 ppm gypsum stabilized with MKG shrank a little less than those stabilized with 5% cement and unstabilized samples, while the 4% lime stabilized soil samples expanded during curing up to 28 days, detailed in FIG. 4B. The soil samples with 10,000 ppm gypsum stabilized with 8% MKG were volumetrically more stable than the other soil samples (FIG. 4C), while the soil samples stabilized with 5% cement shrank the most and 4% lime stabilized soil samples expanded.

The effect of MKG concentration on the volumetric change of the soils during curing shows dependence on the concentration of gypsum, but both 8% and 13% MKG stabilized soil samples had better volumetric stability than unstabilized soil counterparts. Since the soils with a higher gypsum concentration has a higher swelling potential after the stabilization with calcium-based stabilizers, the soil with 10,000 ppm gypsum was used in swelling tests. As seen in FIG. 4C, 4% lime stabilized soils with 10,000 ppm gypsum show a larger expansive potential, with the final expansion of 0.25%, but 5% cement stabilized soils shrank during curing. Therefore, 4% lime was chosen as the control stabilizer in swelling tests to compare with MKG, as discussed in the following sections.

Microstructural and Mineralogical Characterization of Soil Samples

Figure 5A:
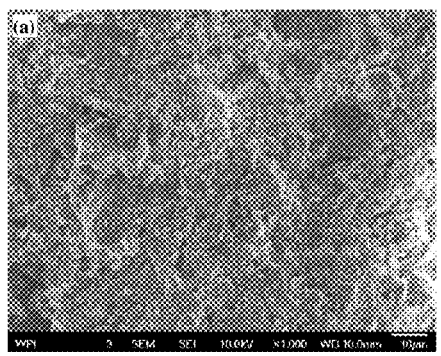
FIGS. 5A-5C show SEM Morphology of (a) Unstabilized Soil, (b) Soil Stabilized with 8% MKG and (c) Soil Stabilized with 13% MKG, with a Gypsum Concentration of 10,000 ppm, cured for 28 days.
Figure 5B:
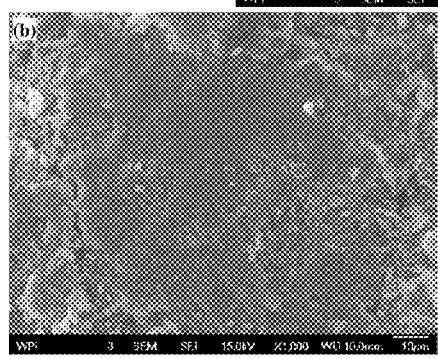
Figure 5C:
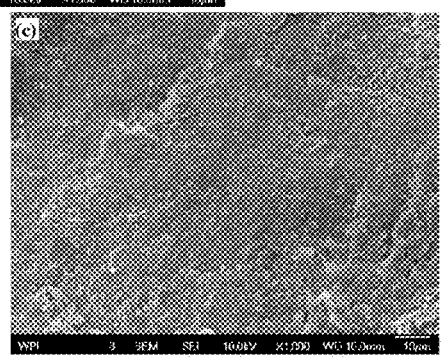

Soils with different gypsum concentrations (1,000, 5,000 and 10,000 ppm) before and after the stabilization with different stabilizers were imaged using SEM to examine microstructural change. The SEM morphology of unstabilized soil, 8% MKG and 13% MKG stabilized soil samples with 10,000 ppm gypsum and cured for 28 days are shown in FIGS. 5A-5C. The microstructure of the soil samples became more homogeneous and denser after the stabilization with either 8% or 13% MKG. A similar trend was also observed in the SEM images of the soils with the gypsum concentration of 1,000 ppm and 5,000 ppm, which are not shown here for brevity. The dispersed geopolymer gel glued the soil particles and made the soil matrices more compact, which resulted in higher strength and stiffness, as shown in FIGS. 2A-2C. The higher concentration of the MKG is used in the soil samples, the higher the strength and stiffness are resulted.

Figure 6A:
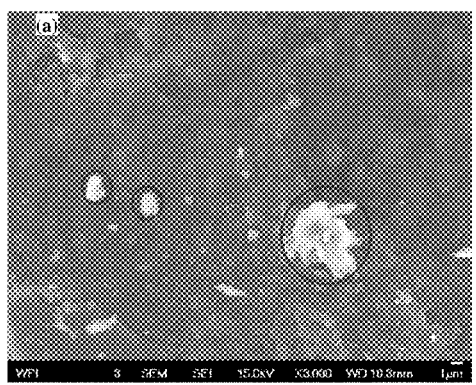
FIGS. 6A-6B Characteristic Morphology of Geopolymer Gels in 28-day cured Soil Samples Stabilized with (a) 8% MKG, Gypsum Concentration=5,000 ppm and (b) 13% MKG, Gypsum Concentration=10,000 ppm.
Figure 6B:
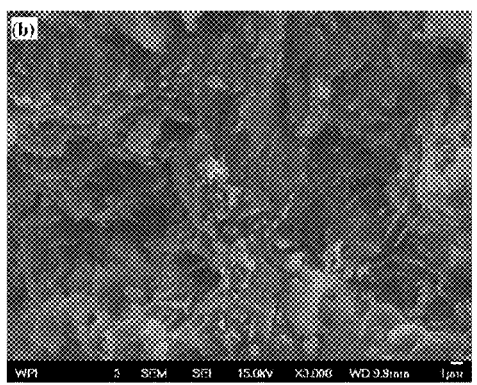

Some characteristic morphologies of geopolymer gels were found in MKG stabilized soil samples using SEM-EDX. For conciseness, only two SEM images are shown in FIGS. 6A-6B. They were taken on a 13% MKG stabilized soil sample with 10,000 ppm gypsum and an 8% MKG stabilized soil sample with 5,000 ppm gypsum, respectively after the curing of 28 days. Based on the EDX spectra, Na, Al, Si and a small amount of sulfur (S) were detected in the circled structures shown in FIG. 6A, and most of the gel-like structures in FIG. 6B. The Na/Al and Si/Al molar ratio of the circled structures are 0.44 and 1.07; while those of the gel-like structures are 1.19 and 1.56, respectively. The gel-like structure is highly likely to be geopolymer gel, since both the Na/Al and Si/Al molar ratios fall within the range of typical values of geopolymer gels (i.e., Na/Al$\approx$1.0 and Si/Al$\approx$1-3). Note that the gel-covered soil particles might affect the EDX results and thus the Si/Al molar ratio of pure geopolymer gels might have been higher than 156. The structure in the circled area maybe belong to non-fully-developed geopolymer gel or the mix of geopolymer gels and soil particles, so the Na/Al molar ratio of which (0.44) is lower than the typical value of geopolymer gel ($\approx$1.0). A small amount of S but no Ca was detected in the structures shown in FIGS. 6A-6B, so there is no ettringite formed in these scanned areas.

Figure 7:
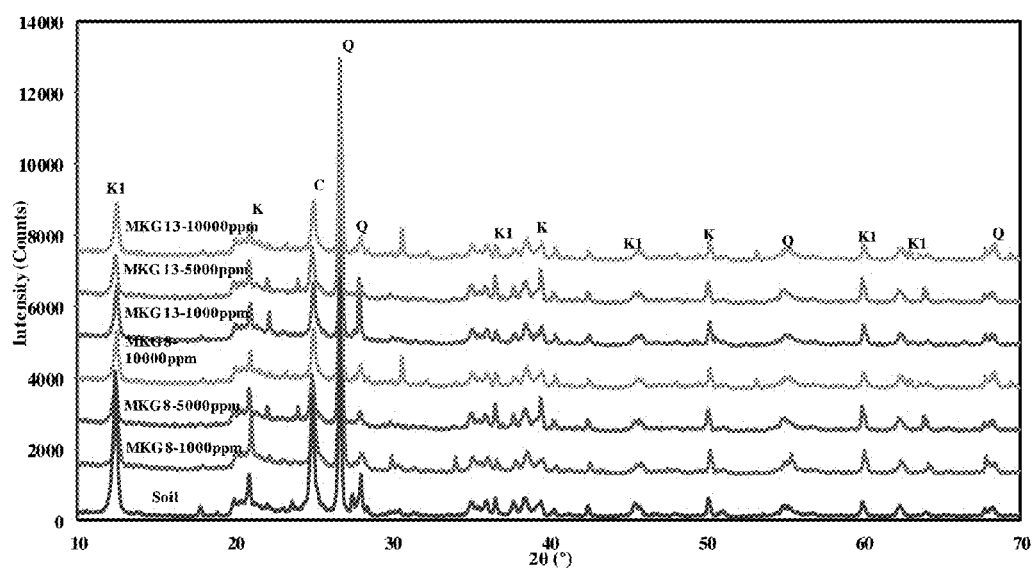
FIG. 7 Shows XRD Spectra of Unstabilized Soil and the Soils Stabilized with 8% and 13% MKG, Cured for 28 days (K: Kaolinite, K1: Kaolinite 1A, C: Cronstedtite-6; and Q: Quartz)

Soil samples with 1,000, 5,000, and 10,000 ppm gypsum stabilized with 8% and 13% MKG and cured for 28 days were scanned with XRD for comparing their mineralogy before and after stabilization. FIG. 7. indicates that the main crystals are Kaolinite (K), Kaolinite 1A (K1), Cronstedtite-6 (C) and Quartz (Q) for the samples before and after MKG-based stabilization. No new crystal was formed after the stabilization, so the improvement of MKG stabilized soils in the mechanical properties discussed previously in section 0 is attributed to the binding effect of the synthesized geopolymer gels rather than the formation of new crystals.

Expansive Potentials of Soil Samples

Soil with 10,000 ppm gypsum was used for swelling tests, because it has the highest sulfate concentration among the soil groups investigated and is the most prone to expansion. The unstabilized soil and the soil stabilized with 4% lime were used as control groups, because the soil stabilized with 4% lime showed more swelling, as shown previously in section 0. Soil samples stabilized with 8% MKG and 13% MKG and those in the control groups were prepared as disks. The swelling test samples were cured at ambient conditions for 7 days and 28 days, respectively, and then put in the conditioning set-up schematically illustrated in FIG. 1.

Figure 8A:
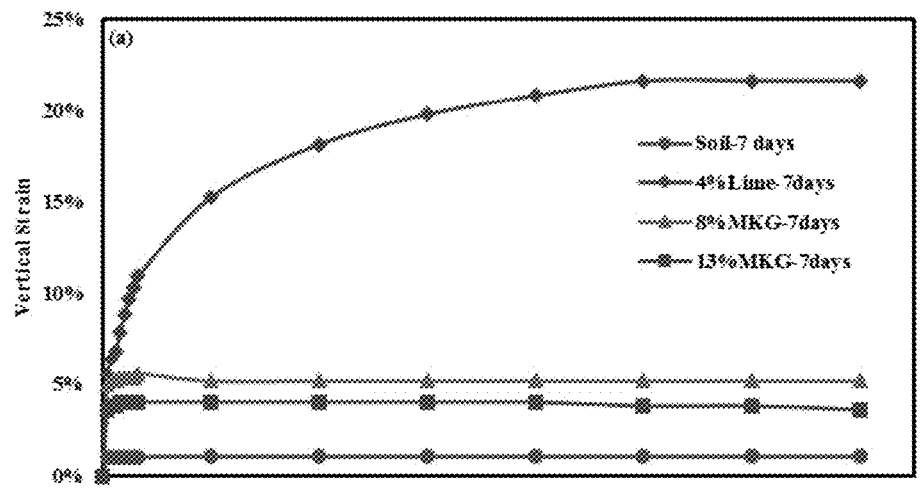
FIGS. 8A-8B show Vertical Expansion of the Soil Samples cured for (a) 7 Days and (b) 28 Days during Swelling Tests up to 7 Days (168 Hours)
Figure 8B:
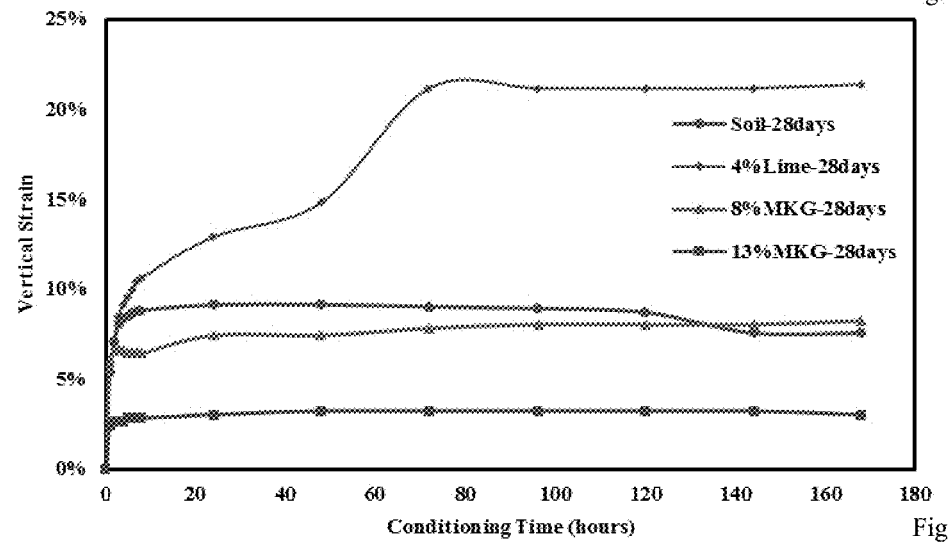

The vertical expansion of the soil samples, in terms of vertical strain, during the conditioning period up to 7 days, is plotted in FIGS. 8A-8B As seen in FIG. 8A, all the soil samples cured for 7 days expanded largely in the first hour, and the expansion reached steady state before the end of the conditioning. After the first hour, the unstabilized soil sample stayed constant volumetrically with a final expansion of 1.06%. The soil samples stabilized with 8% MKG and 13% MKG further expanded by a small amount from the $2^{nd}$ hour to the $7^{th}$ hour. After the initial expansion, the soil sample stabilized with 8% MKG shrank slightly after soaking for 24 hours and remained constant with a final expansive vertical strain of 5.18%. Similarly, the soil sample stabilized with 13% MKG kept shrinking after 96 hours at a low rate and the final expansive vertical strain is 3.63% after soaking for 168 hours. On the contrary, the soil sample stabilized with 4% lime showed a sheer expansion trend during the first 24 hours' conditioning, and the kept expanding at a reduced rate until 120 hours. The final expansive vertical strain of the soil sample stabilized with 4% lime after 7-day conditioning is 21.66%, which is 21 times the expansion of the unstabilized soil sample and around 7 times the expansion of the soil sample stabilized with 13% MKG. The soil samples cured for 28 days exhibit a similar expansion trend to the counterpart cured for 7 days, as shown in FIG. 8B. The 28-day cured soil sample stabilized with 4% lime still had the highest expansion (21.38%), which is about 7 times that of 13% MKG stabilized soil sample (3.01%). However, the soil sample stabilized with 13% MKG showed less expansion during the conditioning period than the unstabilized soil sample (7.56%). Likewise, the soil sample stabilized with 8% MKG showed less expansion than the unstabilized soil sample during the first 120 hours, and ended up with a similar expansive vertical strain (8.22%) as the unstabilized one. Less than 2% of volumetric expansion was considered as the acceptable swell for lime stabilized soils by one of the previous studies; and the 3-D swell of no sulfate soil was used as the baseline to determine the acceptable expansion level by another study. The vertical expansion strain is the same as the volumetric strain of the soil samples in this study because the radial direction of the samples was confined by plastic molds, as shown in FIG. 1 Although the volumetric strain of MKG stabilized soil is still higher than the expansion limits, the expansion of the 13% counterparts is very close to the limits. Additionally, the unstabilized soil samples cured for 7 days and 28 days expanded 1.06% and 7.56% respectively after the 7-day conditioning. Therefore, the expansions of MKG stabilized sulfate-rich soil samples were very low, where the final expansion of 13% MKG stabilized soils cured for 28 days was even lower than the unstabilized counterparts. More importantly, it is feasible to further reduce the extent of swelling for the soil samples stabilized with non-calcium geopolymer by slightly increasing the amount of MKG or optimizing geopolymer mix design.

SEM Images of Swelling Test Soil Samples

Figure 9A:
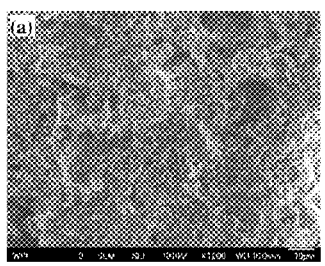
FIGS. 9A-9E SEM Images of (a) Unstabilized Soil Sample and Soil Samples Stabilized with (b) 4% Lime, (c) 8% MKG, and (d) 13% MKG after the Swelling Tests. The Characteristic Needle Structures of Ettringite Detected in 4% Lime Stabilized Sample is Enlarged in (e). (All the stabilized samples were cured for 7 days).
Figure 9B:
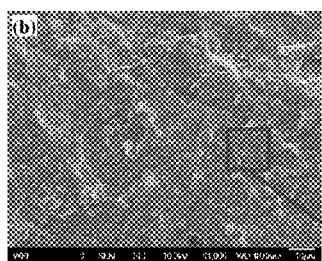
Figure 9C:
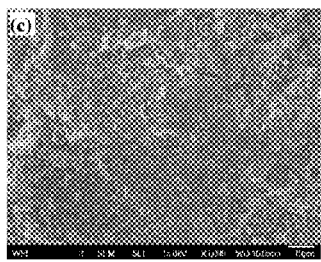
Figure 9D:
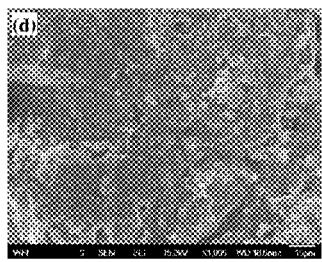

The swelling test samples of the unstabilized soil, soils stabilized with 4% lime, 8% MKG, and 13% MKG were scanned with SEM after being soaked for 7 days. Only the samples cured for 7 days are shown in FIGS. 9A-9E. After stabilization, the microstructure of the soil samples became more homogeneous and compact, as seen in FIGS. 9B-9D.

Figure 9E:
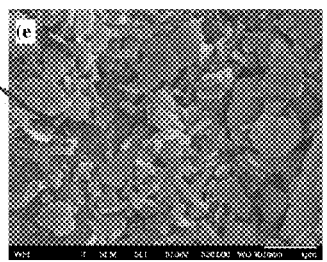

However, the characteristic needle structures of ettringite were only found in the 4% lime stabilized soil sample, not in any MKG stabilized soil sample, as shown in FIG. 9E, where the image is the enlarged version of the circled area in FIG. 9b. This needle structure has also been observed in other sulfate-rich soils stabilized by calcium-based stabilizers reported in previous studies. The needle structures are too small (about 0.1~0.5 μm) and scattered to be detected by EDX, but they are distinguishable enough to show the formation of ettringite nevertheless. Similar needle structures with a more dispersive feature were also spotted in 28-day cured 4% lime stabilized soil samples after 7-day soaking, but not found in unstabilized samples or any MKG stabilized counterparts. The formation of ettringite is the main cause of large expansion of 4% lime stabilized soil sample, as shown in FIGS. 8A-8B. On the other hand, in the unstabilized soil samples and those stabilized with MKG, the expansion is much lower, because these samples expanded due to the loosening of soil particles by penetrating water rather than the formation of expansive crystals. The SEM morphologies shown in FIGS. 9A-9E provide microstructural evidence for different trends in the vertical strain among the soil samples included in FIGS. 8A-8B.

XRD Spectra of Swelling Soil Samples

The 7-day and 28-day cured swelling samples after being soaked for 7 days were characterized with XRD, respectively. However, the main crystals in unstabilized soil, 4% lime, 8% MKG and 13% MKG stabilized soils are still Kaolinite (K), Kaolinite 1A (K1), Cronstedtite-6 (C) and Quartz (Q), so the spectra are not shown for conciseness. Ettringite was not found in XRD spectra because the concentration of gypsum is much lower than the other minerals.

The feasibility of using metakaolin based non-calcium geopolymer to stabilize sulfate-rich soils was verified by testing their mechanical properties and swelling potentials. The unconfined compressive strength, failure strain and Young's modulus of the sulfate-rich soil were significantly improved after being stabilized with MKG, regardless of gypsum concentration. Most importantly, the expansive potential of MKG stabilized soil samples reduced significantly and was much lower than the soils stabilized with conventional calcium based stabilizers (e.g., lime).

For all the gypsum concentrations considered in this study (i.e., 1,000, 5,000 and 10,000 ppm), the UCS, $\epsilon_f$ and E of the MKG stabilized samples cured for 28 days are higher than those cured for 7 days. In other words, the mechanical properties of MKG stabilized soil samples were improved with the curing time. As expected, better mechanical properties of the stabilized soil samples were resulted when a higher MKG concentration was used. Furthermore, the MKG stabilized soil samples were less brittle compared to the counterparts stabilized by cement or lime. With the aid of SEM-EDX, the formation of geopolymer gels in the matrix of sulfate-rich soils was confirmed, which is attributed to the improvement in mechanical properties of MKG-stabilized soil samples.

For the soil with different gypsum concentrations, MKG stabilization improved the mechanical properties at similar degrees, illustrating it is applicable to use a uniform stabilization scheme for soil stabilization with geopolymers while the sulfate concentration is unknown. This is a practical advantage over calcium based stabilizers where sulfate concentration is an essential parameter for stabilization.

The expansive potential of MKG stabilized soil samples were much lower than that of 4% lime stabilized soil samples during the soaking time up to 7 days, for the samples cured both for 7 days and 28 days. The soil samples stabilized with 13% MKG (the vertical strain of 3.63% and 3.01% for samples cured for 7 days and 28 days, respectively) showed even lower vertical expansive strain than those stabilized with 8% MKG (the vertical strain of 5.18% and 8.22% for samples cured for 7 days and 28 days, respectively). Therefore, by using a higher concentration of MKG, the expansive potential of sulfate-rich soils can be further decreased, which is infeasible for the case of calcium based stabilizers.

In 4% lime stabilized soil, the formation of ettringite is confirmed by the characteristic needle structures observed in its SEM images, which provides evidence for the cause of the high expansion of the lime-stabilized soil samples. On the other hand, the needle-shape structures were not found in MKG stabilized or unstabilized soil samples.

Based on the results of this study, metakaolin based geopolymer is proved to be an effective stabilizer for expansive soils with various sulfate concentrations. Unlike conventional calcium-based stabilizers, MKG, or non-calcium geopolymers in general, can significantly improve the mechanical properties of sulfate-rich soils without introducing excessive expansion. Additionally, the mechanical properties of MKG itself are affected by many factors, such as chemical compositions of raw materials, curing temperature and curing time. The sulfate-rich soils' mechanical properties and load-bearing capacity can be further improved by tailoring the chemical compositions and adjusting the curing conditions of geopolymeric stabilizers. Geopolymers synthesized from different raw materials, including wastes and industrial byproducts, should be investigated in the stabilization of natural and contaminated sulfate-rich soils to further develop non-calcium geopolymer as a cheap and effective sulfate-rich soil stabilizer.

While the system and methods defined herein have been particularly shown and described with references to embodiments thereof, it will be understood by those skilled in the art that various changes in form and details may be made therein without departing from the scope of the invention encompassed by the appended claims.

The invention claimed is:

1. A method of stabilizing ground bearing surfaces, comprising:
synthesizing a geopolymer, the geopolymer being a non-calcium geopolymer;
combining the synthesized geopolymer with sulfate rich soil in to generate a soil combination having improved mechanical properties, the geopolymer including aluminosilicate materials formed by the polymerization and polycondensation of aluminate and silicate tetrahedrons by sharing oxygen atoms,
wherein the geopolymer has the form $M_n\{(-SiO_2)_z-AlO_2-\}_n$, where M is a cation to balance the negative charge of $(AlO_2)^{-1}$ and the z value is the Si to Al molar ratio; and
compacting the generating soil combination to a maximum capacity compaction.

2. The method of claim 1 wherein the geopolymer is a metakaolin based geopolymer (MKG).

3. The method of claim 1 wherein combining further includes soil having at least 1000 ppm gypsum concentrations and metakaolin concentration between 8% and 13%.

4. The method of claim 1 wherein the mechanical properties are based on binding soil particles rather than ion exchanging.

5. The method of claim 1 wherein the geopolymer is cured at a temperature in a range of 25° C. to 80° C.

6. The method of claim 5 wherein synthesis of the geopolymer includes forming a geopolymer precursor in a paste form, further comprising mixing the geopolymer with the soil in a concentration between 8% and 13% of MKG (metakaolin based geopolymer).

7. The method of claim 1 wherein the combining occurs in and result in an absence of ettringite.

8. The method of claim 1 wherein synthesizing the geopolymer includes synthesizing from a waste stream having aluminum and silicon based materials.

9. The method of claim 8 wherein the waste stream is derived from at least one of fly ash, furnace slag and red mud.

10. A method of stabilizing ground bearing surfaces, comprising:
synthesizing a geopolymer, the geopolymer being a non-calcium geopolymer;
combining the synthesized geopolymer with sulfate rich soil to generate a soil combination having improved mechanical properties; and
compacting the generating soil combination to a maximum capacity compaction further comprising combining the sulfate rich soil with gypsum to achieve at least a 10,000 ppm gypsum content and combining with MKG (metakaolin based geopolymer) in a range between 8% and 13% for generating a soil combination exhibiting only negative expansion (shrinkage) during a curing time of 28 days.

11. The method of claim 10 wherein the soil combination exhibits a failure strain in a range between 2.5% and 3.0%.

12. The method of claim 10 wherein the soil combination yields a UCS (unconfined compressive strength) of a range between 3.0 and 5.0 MPa (Megapascals).

13. A stabilized weight bearing soil combination, comprising:
sulfate rich soil;
synthesized geopolymer in a ratio of between 8% and 13% of a volume of the weight bearing soil, the geopolymer including aluminosilicate materials formed by the polymerization and polycondensation of aluminate and silicate tetrahedrons by sharing oxygen atoms,
wherein the geopolymer has the form $Mn\{(-SiO_2)z-AlO_2-\}n$, where M is a cation to balance the negative charge of $(AlO_2)-1)$ and the z value is the Si to Al molar ratio; and
gypsum in a concentration of between 1000 and 10,000 ppm.

14. The soil combination of claim 13 wherein the geopolymer is a synthesized metakaolin based geopolymer (MKG).

15. The soil combination of claim 13 wherein the MKG (metakaolin based geopolymer) is synthesized using a geopolymer precursor in a paste form, wherein the combined geopolymer has a soil concentration between 8% and 13% of MKG (metakaolin based geopolymer).

16. A stabilized weight bearing soil combination, comprising:
sulfate rich soil;
synthesized geopolymer in a ratio of between 8% and 13% of the soil volume; and
gypsum in a concentration of between 1000 and 10,000 ppm wherein the sulfate rich soil has at least a 10,000 ppm gypsum content and an MKG (metakaolin based geopolymer) content in a range between 8% and 13% for generating a soil combination exhibiting only negative expansion (shrinkage) during a curing time of at least 28 days.

17. The soil combination of claim 16 wherein the soil combination exhibits a failure strain in a range between 2.5% and 3.0%.

18. The soil combination of claim 17 wherein the soil combination yields a UCS (unconfined compressive strength) of a range between 3.0 and 5.0 MPa (Megapascals).

* * * * *